A. B. BARLOW.

Improvement in Hay Wagon.

No. 124,876.                      Patented March 26, 1872.

Witnesses:                      Inventor:

Geo. F. Meggs                  Aaron B Barlow

Jno. K. Hullock

UNITED STATES PATENT OFFICE.

AARON B. BARLOW, OF ADRIAN, MICHIGAN.

IMPROVEMENT IN HAY-WAGONS.

Specification forming part of Letters Patent No. 124,876, dated March 26, 1872.

*To all whom it may concern:*

Be it known that I, AARON B. BARLOW, of Adrian, in the county of Lenawee in the State of Michigan, have invented a new and Improved Hay-Wagon; and I do hereby declare the following to be a full and exact description thereof, reference being had to the accompanying drawing and the letters of reference marked thereon.

The nature of my invention consists in providing, first, an improved hay-wagon, wherein the bed of the rack shall act as the reach of the wagon, and which is so constructed that it is simply a hay-rack, cheaply and lightly constructed, and provided with axles, to which the wheels of an ordinary wagon can be connected, and thus form a complete hay-wagon. Second, my device consists of a cheaply and lightly constructed hay-rack, which can be used in connection with any ordinary wagon without the use of a box, and which, when in use, will permit the wagon to turn around in the smallest possible space without danger of upsetting.

Figure 1:
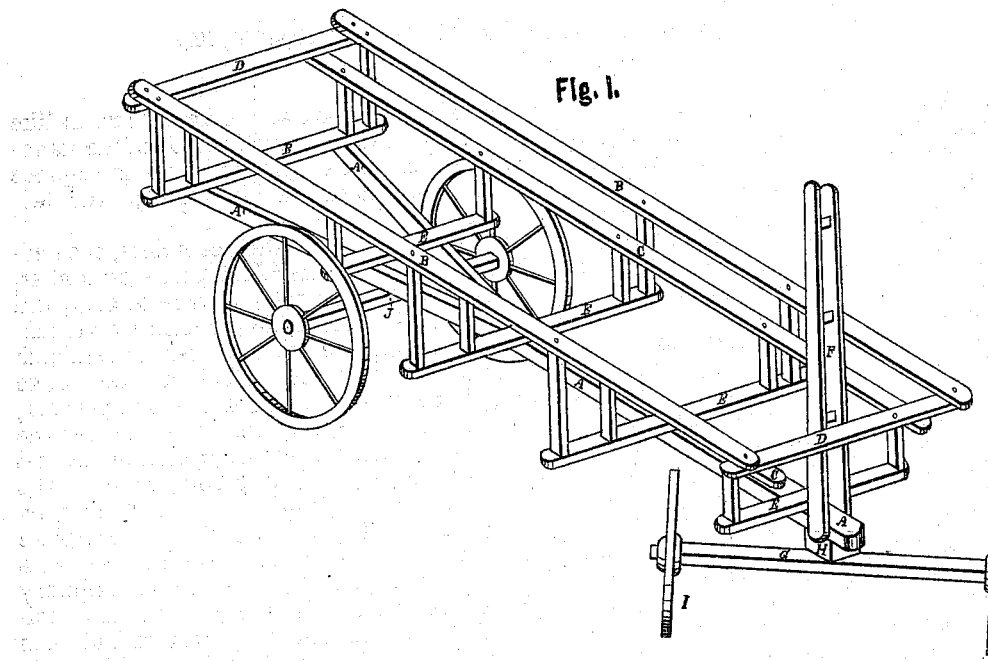
Figure 2:
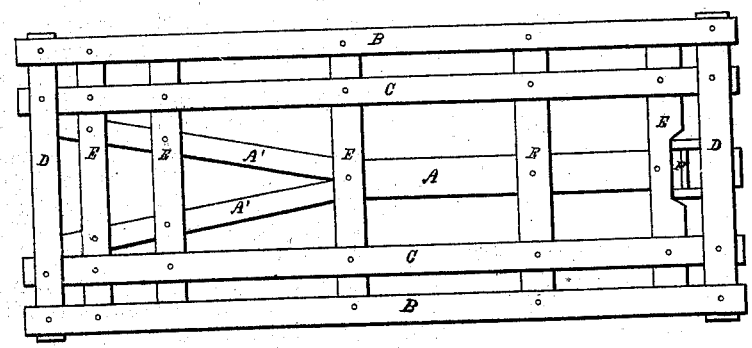

The accompanying drawing illustrates my invention as follows: Figure 1 is a perspective view of my device complete, showing the same as constructed with its own axles, and the wheels of an ordinary wagon used thereon. Fig. 2 is a top or plan view of my device, showing the manner of its construction.

I construct my device as follows: I first construct the bed-piece A A' A', which is composed of a stick of timber, say, 4 × 4 inches. This I saw or "rip" about half its length, and open the sawed ends A' A' in the manner shown in the drawing, and this I intend shall go with the unsawed end A ahead and the sawed and spread ends A' A' behind, as shown in the figure. On this I bolt at intervals bolsters E E E, &c., which are provided with two stakes at each end, which are of wood, and bored through their length and provided with iron rods or bolts through the same. These stakes are of different lengths, the outside ones being the longer. Along the shorter ones I lay the strips C C, and bolt them down with the rods that run through the length of the stake. Across these, at the ends, I place the strips D D, and then across these, and along the tops of the outside stakes, I place the strips B B, which are also bolted down in like manner. At the front end I establish the standard F, which is held upright by the cross-piece D and bolster E and a pin through the bed-piece A.

Now I have my hay-rack complete, the bed-piece of which is one solid piece of timber, without mortise or tenon, brace or stay, and hence is not subject to dilapidation by wrenching or straining. Now, if I wish to establish a hay-wagon complete, I bolt an axle, J, to each of the prongs A' A' of the bed-piece A, as is shown in the drawing, which makes the hind axle. I next provide a front axle, G, and a head-block, H, and king-bolt these to the front end of the bed-piece A. And now, by providing ordinary wheels, I have a complete hay-wagon; but when my device is used as a hay-rack simply, to be used on an ordinary wagon, the rear end is placed on the hind bolster of the wagon, and the front end of A is attached to the front bolster by the king-bolt passing through the same. This manner of attaching completely fastens the rack to the wagon, and the rack cannot slip forward or back as long as the king-bolt lasts. This is a very simple way of overcoming a very troublesome matter.

By forming the bed-piece of a hay-rack of one piece, in the manner shown, and dispensing with the box, the front wheels in turning meet with no impediment until they come to the reach. This gives great facilities for turning, which, when a wagon is loaded with hay, is often a great advantage; and the rack having a common pivot with the reach, the king-bolt greatly adds to the facility for turning; and the bed-piece being sawed and spread into the two prongs A' A' avoids all danger of tipping.

What I claim as my invention, and desire secure by Letters Patent of the United States, is as follows, to wit:

1. The bed-piece A A' A', constructed substantially as described, for the purpose set forth.

2. The combination of the bed-piece A A' A' with the bolsters E E, &c., and the system of stakes and cross and longitudinal strips described, when arranged and combined as and for the purposes described.

3. The combination of the standard F with the cross-strip D and bolster E and bed-piece A A′ A′, as and for the purpose specified.

4. The combination of the bed-piece A A′ A′ with the axles J and G and head-block H, when arranged in the said combination, for the purposes specified.

5. The combination of the bed-piece A A′ A′ with the king-bolt and head-block H or their equivalents, and the front axle G, as and for the purposes specified.

AARON B. BARLOW.

Witnesses:
 JNO. K. HALLOCK,
 G. A. ALLEN.